May 17, 1927.
T. H. OPPENHEIM ET AL
1,629,357
SHAKING SCREEN MECHANISM FOR CORN HUSKING MACHINES
Filed April 6, 1925        3 Sheets-Sheet 1
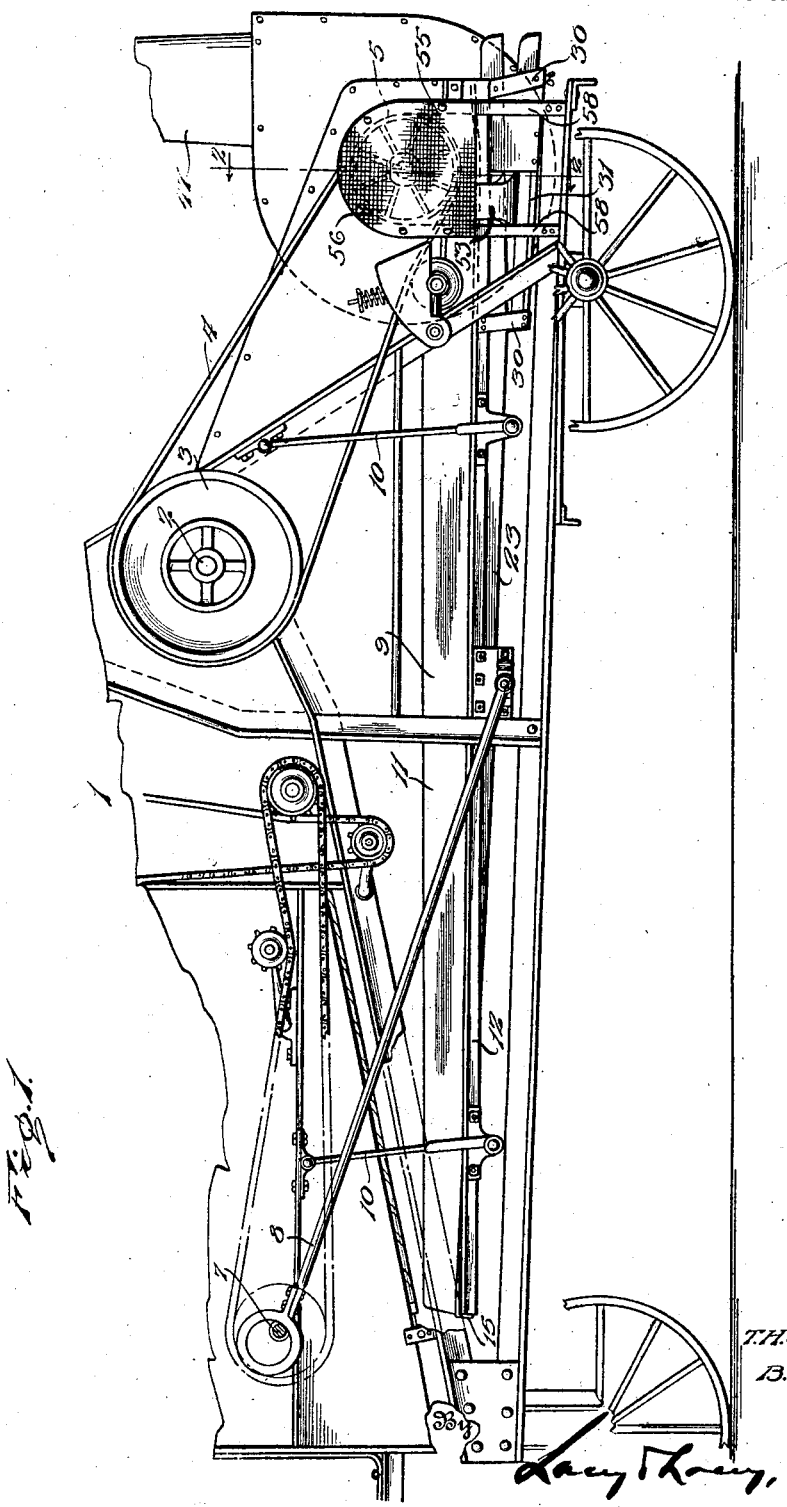
Inventor
T.H. Oppenheim
B. Sethorst
By Lacey T Lacey, Attorney

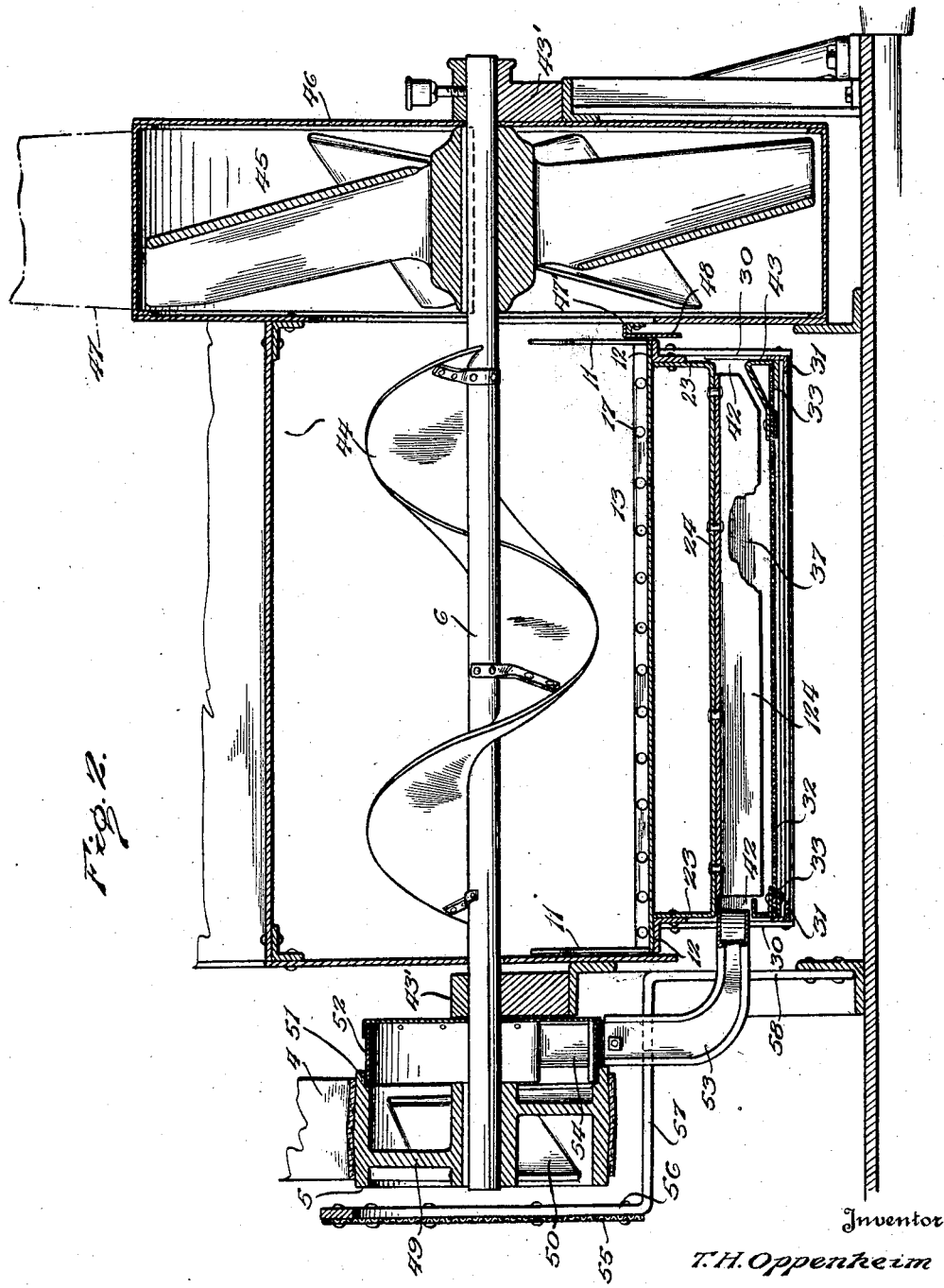

May 17, 1927.
T. H. OPPENHEIM ET AL
1,629,357
SHAKING SCREEN MECHANISM FOR CORN HUSKING MACHINES
Filed April 6, 1925 3 Sheets-Sheet 3
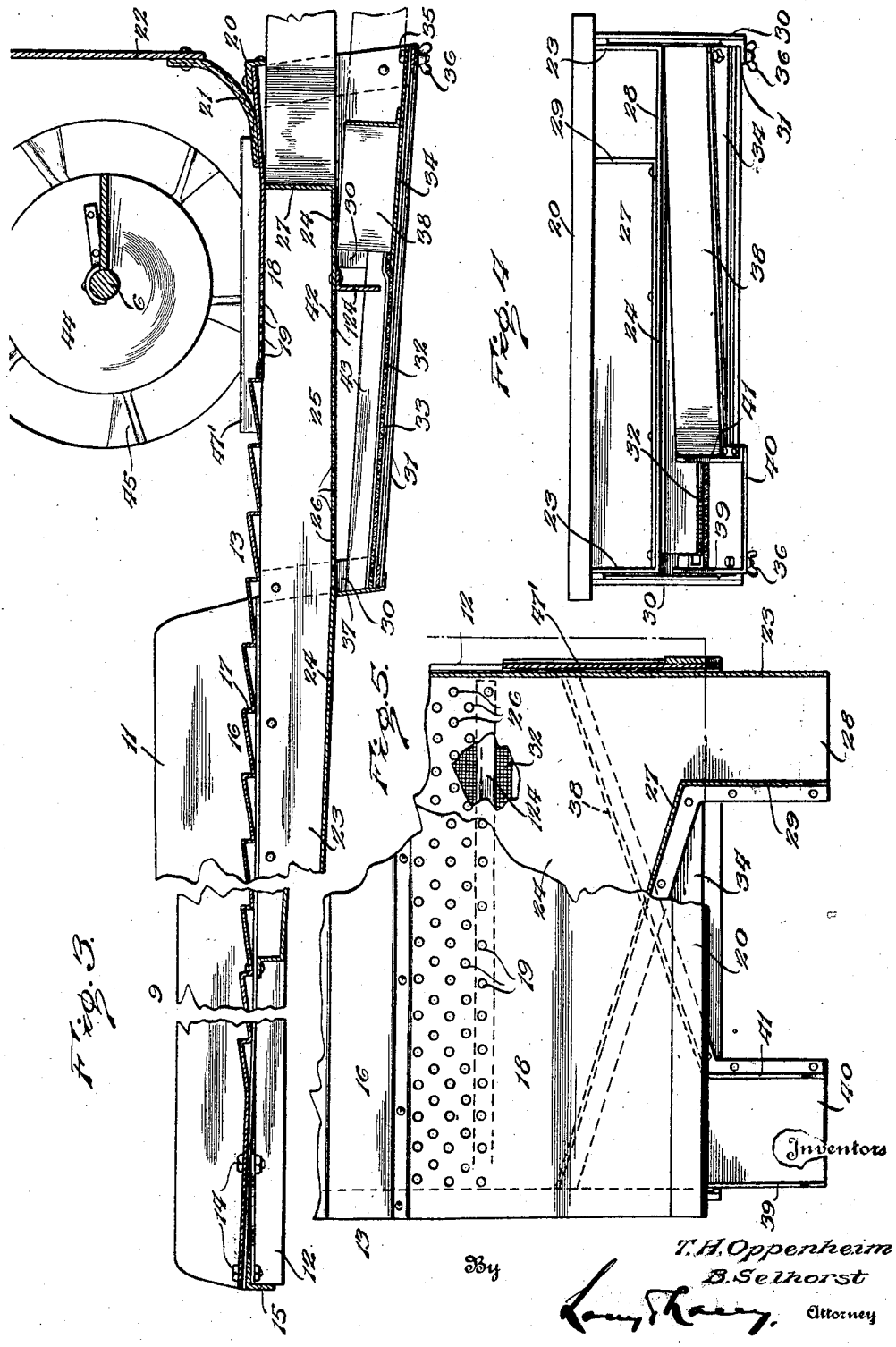
Inventors
T.H. Oppenheim
B. Selhorst
Attorney Patented May 17, 1927.

1,629,357

UNITED STATES PATENT OFFICE.

THEODORE H. OPPENHEIM AND BERNARD SELHORST, OF COLDWATER, OHIO, ASSIGNORS TO THE NEW IDEA SPREADER CO., OF COLDWATER, OHIO, A CORPORATION OF OHIO.

SHAKING-SCREEN MECHANISM FOR CORN-HUSKING MACHINES.

Application filed April 6, 1925. Serial No. 21,064.

This invention relates to corn-husking machines and has special reference to means for separating from the shelled corn the dirt, chaff and other impurities which may be commingled therewith. The invention seeks to provide mechanism for the stated purpose which will be compact and simple in construction and easily operated in a highly efficient manner. The invention also provides means whereby the shelled corn will be collected and delivered into a suitable receptacle, and also provides means whereby the impurities will be carried off independently of the shelled corn.

Other objects of the invention will appear incidentally in the course of the following description, and the invention resides in certain novel features which will be particularly pointed out in the appended claims.

In the accompanying drawings:

Figure 1 is a side elevation of a portion of a corn-husking machine having our improvements embodied therein;

Fig. 2 is a vertical transverse section on the line 2—2 of Fig. 1;

Fig. 3 is a central longitudinal section of the separating mechanism;

Fig. 4 is a rear end elevation of the same, and

Fig. 5 is a top plan view, partly broken away, of the rear delivery end of the mechanism.

The corn-husking machine, a portion of which is shown at 1, embodies a main driving shaft 2 to which motion is imparted from any convenient source of power. This driving shaft 2 is equipped with a pulley 3, around which is trained a belt 4 passing to a pulley 5 on one end of a blower shaft 6 which is mounted transversely in the frame of the machine at the rear end thereof. Other gearing (not shown) connects the main driving shaft with an eccentric shaft 7 driving the husking and snapping rolls of the corn-husking machine, and a pitman 8 is operated by the eccentric shaft to impart oscillation to a shaking screen 9 which is suspended by oscillatory hangers 10 upon the frame of the machine.

The shaking screen 9 comprises side rails 11 secured to angle bars 12 forming the sills of the shaking screen which is located in the lower portion of the corn-husking machine, as clearly shown in Fig. 1. The upper screen 13 is removably secured in the screen frame by bolts 14 inserted through the marginal portion of the screen at the front end thereof and through the horizontal webs of the sills 12. The foremost bolts 14 also pass through a cross sill 15 so that a strong structure is provided, but by loosening the nuts upon the bolts 14 the screen 13 may be easily removed when necessary. The screen 13 is transversely corrugated or given a step-like formation, as shown at 16, through the greater portion of its length, the tread members of the several steps being imperforate and openings 17 being formed through the riser portions of the steps. The steps are so disposed that the risers are presented toward the rear end of the screen and the openings 17 in the alternate steps are relatively staggered. While we have shown the openings 17 as circular, it is to be understood that they may be given other outlines as may be preferred or as experience may demonstrate to be most desirable. At the delivery or rear end of the screen, there is a flat or substantially flat plate 18, and openings 19 are formed through this flattened portion immediately adjacent the rearmost step, as shown, while the greater portion of the plate is imperforate. It will also be noted that this flat plate is disposed below the blower shaft 6, the purpose of this arrangement appearing hereinafter.

The plate 18 which constitutes a receiving platform for stupples, may be a part or a continuation of the stepped plate and its rear edge is reinforced by a transverse angle bar 20, while a sealing flap 21 of leather or other similar flexible material is secured to the lower end of the rear end plate 22 of the corn-husking machine frame and bears upon the smooth upper surface of the platform so that the material which reaches the latter will be prevented from passing out through the rear end of the machine. Below the upper screen 13 is disposed a second screen which is constructed with side rails 23, secured to the sills 12, and a bottom plate 24 which may conveniently be formed integral with the side rails 23, as shown clearly in Fig. 2. It may be noted at this point that the screen frames are constructed of sheet metal, thereby obtaining a stronger and more durable structure than the wooden screens now most generally employed and also prolonging the life of the machine as well as attaining a quieter operation. The bottom plate 24 of the lower screen inclines downwardly and rearwardly through the greater portion of its length and is imperforate, while its rear portion, as shown at 25 in Fig. 3, is provided with perforations 26 therethrough and is also constructed with an obliquely arranged vertical deflecting wall 27 extending from one side rail 23 rearwardly toward the other side rail and then outwardly parallel with the last-mentioned side rail over an elongation 28 of the bottom plate 24 whereby to constitute a delivery spout, as shown at 29 in Fig. 5.

Secured to the sills 12 and to the side rails 23 of the second screen are hanger plates 30, and relatively short sills or angle bars 31 are secured to the lower ends of these hanger plates, it being noted, as shown most clearly in Figs. 1 and 3, that these sills 31 are inclined downwardly toward the rear end of the machine. A third screen 32 is supported on the sills 31, and this screen may be of suitable mesh wire netting secured upon a frame, indicated at 33, whereby its shape will be maintained. The screen 32 extends between the hangers 30, and it will be noted that the rear hangers 30 are appreciably longer than the front hangers and that the screen 32 terminates very slightly in rear of the front ends of the rear hangers. An imperforate plate 34 extends from the rear edge of the screen 32 to the rear ends of the sills 31 and underlies the rear edge of the said screen 32, the overlapping edges being rigidly secured together, and the screen and the imperforate plate being removably held to the sills by bolts 35, inserted through the rear end of the plate 34 and the rear ends of the sills, and wing nuts 36 mounted on the lower ends of the bolts and turned home against the sills. A cross plate 37 is secured to the front hangers 30 and thereby prevents escape of the shelled corn or other material over the front end of the screen while upon the upper surface of the plate 34 is secured a vertically disposed obliquely arranged deflecting plate or wall 38 which, as shown most clearly in Fig. 5, is reversed relative to the deflecting wall 27 and extends rearwardly toward the opposite side of the machine, the end of said wall 38 being arranged parallel with the side rail 39 of the plate 34 and secured upon an extension 40 of said plate, as shown at 41, whereby to define an outlet spout. Upon referring to Fig. 4, it will be noted that the material passing over the screen 32 will be positively directed toward the outlet spout and will be prevented from accumulating on and choking the operation of the screen.

The side members of the third or lowermost screen terminate in spaced relation to the bottom of the intermediate screen, thereby providing an open space, as indicated at 42, and upon the screen 32 along the right-hand edge thereof, as viewed in Figs. 2 and 4, we secure a deflecting and sealing strip 43 which rises slightly from the screen so that the particles of chaff and other light material which are influenced by the blast passing over the screen will be driven therefrom and permitted to escape at the side thereof while the shelled corn, being heavier, will not be driven out through the opening 42 but will pass over the screen and the plate 34 to the outlet spout defined by the members 39, 40 and 41.

Secured to the under side of the plate 24 is a transverse baffle plate 124 which extends the full width of the screen but has its lower edge spaced from the screen 32, as clearly shown in Fig. 3. This plate constitutes a rear wall for the chamber through which the cleaning blast flows and prevents the blast flowing to the discharge spout while providing ample clearance for the passage of the shelled corn.

The blower shaft 6 is rotatably mounted in bearings, as 43′, provided therefor upon the frame of the corn-husking machine and, between the sides of the machine, it is equipped with a spiral conveyer 44 whereby the leaves or particles of husks and stalks which may have passed from the snapping and husking rolls of the machine will be positively fed to the large blower or fan 45 secured upon the right-hand end of the blower shaft and operating within the fan casing 46 secured upon the frame of the machine. This fan casing has its outlet communicating with the usual discharge spout 47. This spiral conveyer 44 cooperates with the suction created by the large blower so that the larger heavier particles reaching the platform at the rear end of the uppermost screen will be positively drawn from the screen and driven off, and choking of the blower fan 45 is eliminated by this arrangement. To prevent any shelled corn or other desirable particles passing into the fan casing, we provide a sealing and retaining strip 47′ which is secured to the fan casing at the lower edge of the inlet opening therein and projects above the top of the screen when the screen is in its lower position, as clearly shown in Figs. 2 and 3. As clearly seen in Fig. 2, this sealing and retaining strip projects slightly above the lower edge of the inlet opening of the fan casing and also has a portion 48 projecting below the adjacent sill 12 at the side of the same which accommodates the slight vertical movement of the screen and prevents any shelled corn which may have failed to pass to the second screen from dropping to the ground. At the opposite side of the machine, the driving pulley 5 is shown secured upon the fan shaft, and this pulley is of an open form having spokes 49 connecting its periphery with its hub, obliquely disposed webs 50 being formed upon the spokes and extending therefrom circumferentially of the pulley so that they operate as fan blades. The inner edge of the periphery of the pulley 5 is recessed, as shown at 51, whereby a casing 52 may fit within the pulley to receive the blast created thereby and direct the same through a spout 53 into the space between the screen 24 and the screen 32. The casing 52 is, of course, open at the side presented to the pulley 5 and closed at its opposite side and arranged between the pulley and the frame of the machine, while the outlet opening 54 establishes communication between the interior of the casing and the spout 53, the spout leading downwardly and then laterally inward so as to direct the blast across the screen 32 immediately below the screen 24.

To prevent injury to persons near the machine, due to contact with pulley and fan 5 or by reason of their clothing being caught in the suction created by the same, we provide a guard consisting of an open mesh screen 55 disposed at the outer side of the pulley fan and secured to a U-shaped frame 56 which is disposed vertically in spaced relation to the outer side of the pulley fan and has its side members extended horizontally inward below the pulley, as at 57, to pass at opposite sides of the spout 53 and then downwardly to provide legs 58 secured to the frame of the corn-husking machine.

In the operation of the corn-husking machine, there is a quantity of corn shelled or removed from the ears of corn, and in many machines no provision is made for saving this shelled corn which is consequently lost and represents a very considerable waste. In our machine, the screen is located below the husking rolls in position to receive the shelled corn together with particles of chaff, dirt and small pieces of stalk which may have escaped the other mechanism of the machine and as the screen is reciprocated through the action of the eccentric shaft 7 and the pitman 8 this commingled shelled corn, chaff, dirt, pieces of stalk, etc., is received by and thrown slightly upward by the stepped portion of the uppermost screen. The riser portion of this step construction exerts a somewhat forcible impact upon the material so that it is fed toward the rear end of the screen but at each impact corn and smaller particles of dirt, chaff and other material will pass through the openings 17 and fall upon the intermediate screen 24. Inasmuch as the blower shaft is rotating simultaneously with the oscillation or reciprocation of the screen, a strong blast is carried across the machine at the rear end of the uppermost screen and the larger leaves, cut stalks, etc. are drawn out and discharged through the spout 47, constituting a fodder supply. Any shelled corn, however, which may have passed beyond the step portion of the screen will be received upon the perforated part of the platform 18 and will drop through the perforations 19 onto the second screen. This second screen is, of course, reciprocating with the top screen and will serve to agitate the material deposited thereon so that while the larger particles of stalks and chaff, dirt and other impurities will be prevented from passing through the screen, the corn and the lighter particles will pass through the same and be received by the screen 32. The matter separated from the corn will ride against the deflecting wall 27 and pass out through the waste spout and may be deposited upon the ground. The blast created by the pulley fan 5 will pass through the spout 53 and be delivered between the screens 24 and 32, as will be readily understood upon reference to Fig. 2, so that the lighter chaff will be blown out at the opposite side of the machine. The screen 32 will be of such mesh that the shelled corn will be arrested thereby while the sand and other dirt will drop therethrough, the shelled corn passing to and against the deflecting wall 38 whereby it is directed to the outlet spout and thence into a suitable receptacle placed below the said spout. If, as sometimes happens, soy beans or the like should be commingled with the shelled corn, an additional screen (not shown) may be provided below the screen 32 so as to separate the beans from the remaining dirt and thereby save the beans.

It will be readily noted from the foregoing description, taken in connection with the accompanying drawings, that we have provided a simple and compact mechanism whereby the shelled corn will be positively collected and saved and will be delivered into the receptacle provided therefor free of all impurities and in a clean condition. It is also to be noted that the corn in passing to the screen 32 is subjected to the action of an air blast which aids in drying it and also aids in removing the particles of sand and dirt which tend to adhere thereto. By subjecting the corn to the action of the air blast, its value is increased inasmuch as shelled corn which has been thoroughly aired and ventilated will not deteriorate as quickly as corn which has not been so treated.

The imperforate portion 18, cooperating with the strip 21 and wall 22, constitutes a platform for receiving the larger leaves and other particles where they will necessarily be subjected to the action of the blower 45 and carried away. While we have shown the fan 50 secured on the blower shaft 6, it will be understood that this fan may be mounted on some other high speed shaft and the blast therefrom carried to the point of delivery between the screens 24 and 32. Various changes may be made in minor details of arrangement without departing from the spirit or scope of the invention as the same is defined in the following claims.

Having thus described the invention, we claim:

1. In a corn-husking machine, the combination of a screen, means for reciprocating the screen longitudinally, means for creating an air blast transversely across the screen, and a transverse conveyer cooperating directly with said blast-creating means the entire conveyer being located above the screen to act upon waste matter passing from the screen.

2. In a corn-husking machine, the combination of a screen, means for reciprocating the screen longitudinally, a blower shaft disposed transversely over the screen, a fan secured upon said shaft at one side of the screen, and a conveyer mounted upon said shaft and leading to the fan, the conveyer extending across the full width of the screen and acting upon waste matter passing from the screen.

3. In a corn-husking machine, the combination of a screen, means for reciprocating the screen longitudinally, a blower shaft disposed over the screen transversely thereto, a fan secured upon the shaft at one side of the screen, and a spiral conveyer secured upon the shaft and leading to the fan, the conveyer extending over the full width of the screen and acting on waste matter passing from the screen.

4. In a corn-husking machine, the combination of a reciprocatory screen, an exhaust blower at one side of the screen, and a conveyer operating transversely above the screen to move toward the blower waste matter passing from the screen.

5. In a corn-husking machine, the combination of a plurality of superposed screens, means for reciprocating the screens longitudinally as a unit, a blower shaft disposed above the screens transversely thereto, means actuated by said shaft for creating an air suction transversely over the uppermost screen, and means actuated by said shaft for delivering an independent air blast across a lower screen directly into the means for creating the suction.

6. In a corn-husking machine, the combination of superposed screens, means for reciprocating the screens longitudinally as a unit, means at one side of the path of movement of the screens for creating an air suction transversely across the upper screen, and means at the opposite side of the path of movement of the screens for delivering an air blast transversely across a lower screen.

7. In a corn-husking machine, the combination of a plurality of superposed screens, means at one side of the screens to draw an air blast across the uppermost screen, means at the opposite side of the screens to drive an air blast across a lower screen whereby the blasts and matters carried thereby will escape from both screens at the same side, and retaining strips arranged at the blast escape side of the screens.

8. In a corn-husking machine, the combination of superposed screens, means for reciprocating the screens, a blower shaft arranged above the screens, a pulley secured upon said shaft whereby power may be applied to the shaft, fan blades formed in said pulley, a casing fitting to the inner side of the pulley, and a discharge spout leading from said casing and delivering the blast between the screens at one side thereof.

9. In a corn-husking machine, the combination of screens, means for reciprocating the screens, a blower shaft disposed above the screens, a pulley secured upon said shaft, fan blades in said pulley, means for conveying an air blast from the said fan blades to the screens, a frame erected at the outer side of the pulley, and a guard screen carried by said frame.

10. In a corn-husking machine, the combination of a screen frame, means acting on said frame to reciprocate the same, a top screen secured to said frame, an intermediate screen secured in the frame below the top screen, in fixed relation to the top screen, hangers secured rigidly to and depending from the frame and the intermediate screen, a lower screen supported upon the lower ends of said hangers, means for creating an air blast transversely over the top screen, and means for driving an air blast transversely between the intermediate screen and the lower screen.

11. In a corn-husking machine, the combination of a machine frame, a top screen secured in said frame, an intermediate screen secured in the frame below the top screen, hangers depending from the frame and the intermediate screen, a lower screen carried by the lower ends of said hangers, an obliquely disposed deflecting wall upon said lower screen adjacent the rear end thereof, a spout leading from the rear end of said deflecting wall, and a cross plate secured to the front hangers and abutting the front end of the lower screen and the bottom of the intermediate screen, the spaces between the lower screen and the intermediate screen at the sides thereof being open.

12. In a corn-husking machine, the combination of superposed screens, means for reciprocating the screens, means at one side of the screens for creating an air suction across the upper screen, means at the opposite side of the screens for delivering an air blast across a lower screen, and a transverse baffle depending from the upper screen at the rear of the path of the blast across the lower screen and having its lower edge out of contact with the lower screen.

13. In a corn-husking machine, the combination of a plurality of superposed screens, a suction blower at one side of the screens, and a retainer strip across the entrance to the blower between the same and the side of the screens and having a pendent portion adjacent and free of the sides of the screens, the vertical extent of said pendent portion being greater than the vertical movement of the screens.

14. In a corn-husking machine, the combination of a reciprocatory screen, an imperforate receiving platform at the delivery end of the screen, an exhaust blower at one side of the platform creating a blast transversely of the platform and the screen, and a transverse spiral conveyer operating over the platform.

15. In a corn-husking machine, the combination of a reciprocatory screen, a receiving platform at the delivery end of the screen, an exhaust blower at one side of the screen and the platform, and a conveyer operating above the platform to positively move bodies thereon to the blower.

16. In a corn-husking machine, the combination of a plurality of superposed screens receiving shelled corn from the husking elements of the machine, means for reciprocating the screens longitudinally, means for creating an air suction over the uppermost screen at an angle to the direction of movement of the screens, and means for simultaneously driving an air blast over a lower screen at an angle to the direction of movement of the screens, the blast and the suction being entirely independent of each other in their passage over the respective screens.

In testimony whereof we affix our signatures.

THEODORE H. OPPENHEIM. [L. S.]
BERNARD SELHORST. [L. S.]